United States Patent Office 3,026,412
Patented Mar. 20, 1962

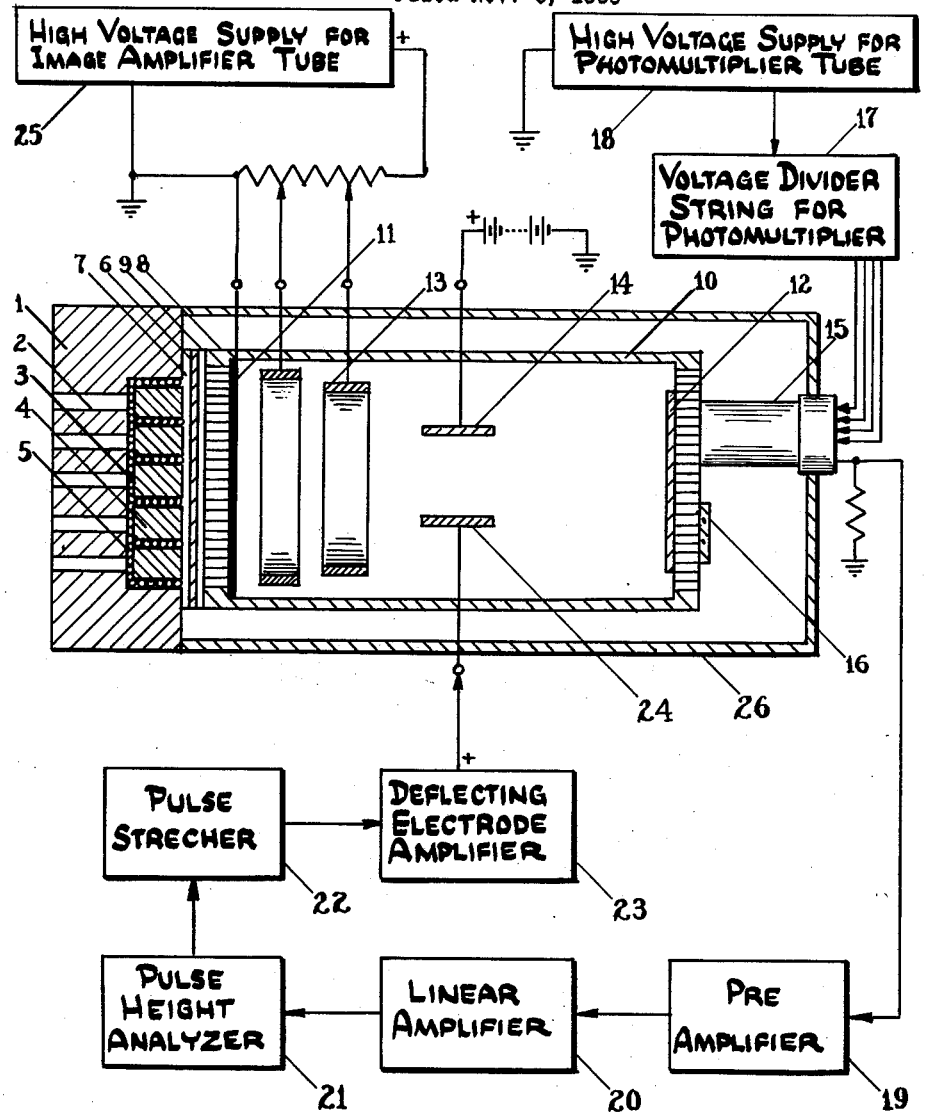

3,026,412
IMAGE AMPLIFIER SYSTEM
Roland W. Carlson, East Cleveland, Ohio
(19710 Euclid Ave., Euclid 17, Ohio)
Filed Nov. 6, 1959, Ser. No. 851,454
6 Claims. (Cl. 250—71.5)

The present invention relates to improved image amplifier systems and to nuclear radiation sensitive devices employing said improved image amplifier systems such as, for instance, scintillation cameras.

Image amplifiers are photoelectric devices which convert an input light image into an output light image of increased intensity. Basically, the image amplifier consists of a cylindrical glass envelope surrounding a series of focusing and accelerating electrodes. The top portion of the cylindrical glass envelope contains a light sensing device called the photocathode. Light incident on the photocathode causes it to emit photoelectrons which are then focused and accelerated by the electrode system to a chemical end screen on the base portion of the cylindrical glass envelope. The photoelectrons are then converted by the chemical screen to a light output image of increased intensity.

Image amplifier tubes, however, are subject to a phenomenon called dark current, which is a flow of electrons produced in the absence of light. The dark current defect of image-amplifier tubes is principally due to thermionic emission by the photocathode. Since photocathodes have a comparatively low work function, a certain amount of thermionic emission will take place, even at room temperature. Such thermionic current has proven to be a considerable detriment where very low light levels are being dealt with. This current along with its associated fluctuations will be amplified by the electrode system and, therefore, be eventually recorded on the chemical screen at the base of the image amplifier tube.

Image amplifier tubes are also limited in their effectiveness in that the tubes will not function selectively. More specifically, the image amplifier tubes will not filter out that incident light which is not of a preselected intensity. The advantage of selective filtration is readily apparent when the image amplifier tubes are employed in devices such as, for instance, celestial scanning devices or nuclear radiation sensing devices. Celestial scanning devices or nuclear radiation sensing devices are subjected to a wide range of incident light intensities although the operator may be interested in only a very narrow intensity range.

The foregoing defects of image amplifier tubes are exceptionally noticeable when the image amplifier tubes are employed in devices of the class known as scintillation cameras. Scintillation cameras are devices which may be employed by physicians in tracer study of radioactive substances within the human body. Scintillation cameras consist of an image forming collimator preceding scintillation phosphors having the ability to convert nuclear radiation energy into light energy, an image amplifier tube coupled to said phosphors and suitable recording or viewing devices used in conjunction with the amplified image. Scintillation cameras employing the image amplifier tube systems of the prior art are subject to a constant flow of dark current, which will result in fogging of film in the event that film is used as a recording device or in a clouded view in the event that the image is being viewed by the scintillation camera operator. The image amplifier systems of the prior art also limit scintillation cameras to a blanket study of all radioactive emanations within the human body, that is, the scintallation cameras of the prior art are unable to selectively view radioactive substances of a given energy.

It is, therefore, an object of this invention to provide a novel and improved image amplifier system which is free from the detrimental defects of dark current.

It is another object of this invention to provide a novel and improved amplifier system which is sensitive to light of a preselected intensity.

It is still another object of this invention to provide a scintillation camera which is free from the detrimental effects of image amplifier tube dark current.

It is a further object of this invention to provide a scintillation camera which will view radioactive emanations of a preselected energy.

I have now discovered an image amplifier system which employs a novel circuit connected to deflecting plates interiorly located between the focusing and accelerating electrodes of the image amplifier tube and the chemical end screen. The deflecting plates carry an electric charge so controlled as to allow the steam of electrons flowing from the photocathode of the image amplifier tube to be either viewed or turned aside. A photomultiplier tube located at the base of the image amplifier tube monitors the electron flow produced within the image amplifier tube. When the electron flow is monitored by the photomultiplier tube, an electrical signal is passed on to a pulse height analyzer. If the electrical signal is of a preselected value, it will pass through the pulse height analyzer and energize a pulse stretcher; if not, the electrical signal will terminate at this point. The stretched pulse then travels to a deflection amplifier which applies a suitable voltage pulse to the deflecting plates to deflect the stream of electrons and allow them to be viewed. By this novel system, dark current need not be viewed, unless a desired signal is present and filtration of light of a preselected intensity is possible.

The novel image amplifier system may be used to provide a scintillation camera which is free from dark current defects and which will view radioactive emanations of a preselected energy. Selective viewing is possible because the light intensity produced in the luminophore is directly proportional to the nuclear radiation energy. The improved scintillation camera is prepared by mounting an image forming device on a nuclear radiation sensitive screen. The screen is a mosaic of luminophores having the ability to convert nuclear radiation energy into light energy. The preferred luminophore is thallium activated cesium iodide, although other luminophores may be employed such as thallium activated sodium iodide, thallium activated potassium iodide and plastic phosphors (luminophores dispersed in organic polymeric resins). The image forming device may be either a pin hole type collimator, or a multichannel straight bore collimator or any of the radio-active image forming devices commonly employed. The mosaic screen is optically coupled to a filter which compensates for variations in response between the individual luminophores and variations in photocathode response. The filter is then optically coupled to the image amplifier tube. The entrance window of the image amplifier tube as well as the exit window are preferably formed from fiber optical glass to reduce lateral dispersion of the images and also to serve the well known function of light piping in the event that there is a curvature in the entrance window. The image amplifier system has the structure outlined in the preceding paragraph, however, a photomultiplier tube is optically coupled to one portion of the exit window of the image amplifier tube, and a suitable recording device such as a camera or a viewer is optically coupled to an adjacent portion. Radioactive emanations which present themselves to the mosaic screen are converted to light pulses which are converted to a stream of electrons in the image amplifier tube which may then be viewed without dark current interference according to the preselected intensity determined by the image amplifier system.

It should be noted that a critical time factor is present in the operation of the improved scintillation camera. The camera is preferably designed so that the stretched pulse holds the image in the viewing position until about 95% of the scintillation light has been generated in the scintillation luminophore. In order to take advantage of 95% of the scintillation light, the time required to shift the image should be very small compared with the decay time of the luminophore, the decay time of the chemical end screen of the image amplifier tube should be very small in comparison with the decay time of the luminophore, and the pulse produced by the pulse stretcher should be about three times the decay time of the luminophore. As an example of pulse time, the pulse from the pulse stretcher should be 3.3 microseconds for a thallium activated cesium iodide scintillation crystal having a decay time of 1.1 microseconds.

Various other features and advantages of the invention will be apparent from the detailed description of the drawing which follows:

The drawing, which is not to scale, is a sectional sideview of a scintillation camera complete with wiring diagram. While the drawing is of a scintillation camera, it should be understood that the novel amplifying system of this invention is not limited to such usage alone but may be employed in other devices such as, for instance, a celestial scanner.

In the drawing, a collimator 1, having channels 2 therein is joined to a mosaic crystal screen 3, the crystal screen 3 being made up of individual luminophores 4, which are coated with a suitable reflective coating 5. The mosaic screen 3 is joined to a compensating density filter 6 by means of an optical coating 7. The compensating density filter 6 is joined to an image amplifier tube 8 by means of an optical coupling coating 9. The image amplifier tube 8 consists of a cylindrical glass tube 10, having a photocathode 11 disposed at its forward portion and a chemical end screen 12 deposited on its face portion. A series of accelerating and focusing electrodes 13 are arranged within the glass cylindrical tube 10. Between the focusing and accelerating electrodes 13 and the chemical end screen 12 are disposed deflecting plates 14 and 24. The photomultiplier tube 15 is optically coupled with the base of the image amplifier tube 8. A suitable recording device 16 is coupled to the base of the image amplifier tube 8 immediately adjacent to the photomultiplier tube 15. The photomultiplier tube 15 and the image amplifier tube 8 are enclosed by a light tight housing 26 which is coupled with the collimator 1. The photomultiplier tube 15 is then connected by means of suitable circuitry with the voltage divider string 17, which is in turn connected by suitable electric circuitry with a high voltage power supply 18. Photomultiplier tube 15 is also in circuit with a preamplifier 19, preamplifier 19 being connected with a linear amplifier 20; the linear amplifier 20 being connected with a pulse height analyzer 21. The pulse height analyzer 21 being connected with pulse stretcher 22. The pulse stretcher 22 being connected with a deflecting amplifier 23, which is in turn connected with a deflecting plate 24. The deflecting plate 14 is connected to a suitable electric power supply. The focusing and accelerating electrodes 13 are connected to a resistor, which is in circuit with a high voltage power supply 25.

In practice, radioactive emanations from source of nuclear radiation energy present themselves to a collimator 1, where they are channeled through bore holes 2 to form a suitable image on the mosaic screen 3. The nuclear radiation energy is converted into light pulses by the luminophores 4, said light pulses being prevented from disseminating by the reflective coating 5. The light pulses then pass through the optical coupling 7 and are equalized by means of compensating density filter 6. The equalized image then passes through optical coupling 9 to the photocathode 11 of the image amplifier tube 8. The light image is converted to a stream of electrons at the photocathode 11. The stream of electrons being focused and accelerated by means of the focusing and accelerating electrodes 13. The stream of electrons presents itself to the chemical screen 12, where it is converted into light energy, which is again converted into an electrical impulse by means of the photomultiplier tube 15. Electrical impulses from the photomultiplier tube 15 pass by means of suitable circuitry through the preamplifier 19, the linear amplifier 20 and the pulse height analyzer 21. If the electrical impulse is of suitable amplitude, it will pass through to the pulse stretcher 22. The voltage pulse from the pulse stretcher will then be amplified by means of the deflecting amplifier 23, which will charge deflecting plate 24. When deflecting plate 24 receives a charge, the remainder of the flow of electrons emanating from the focusing and accelerating electrodes 13 will be diverted to the recording instrument 16. It should be noted that the circuitry is such that the pulse height analyzer will prevent any current of low intensity, such as dark current, emanating from the photocathode 11 from reaching recording device 16. The pulse height analyzer 21 may also limit the viewing of the recording device 16 to such radioactive emanations as are within a preselected energy setting at the pulse height analyzer.

Having thus described my invention, what I claim is:

1. An image amplifier system comprising an image amplifier tube of the type having focusing and accelerating electrodes disposed intermediate a light sensing photocathode and a chemical end screen and a pair of deflecting plates positioned between said focusing and accelerating electrodes and said chemical end screen, said deflecting plates being in circuit with selective electric charging means whereby a charge may be selectively placed on one member of said pair of deflecting plates which is of sufficient intensity to deflect a stream of electrons flowing out of said accelerating electrodes.

2. An image amplifier system comprising an image amplifier tube of the type having focusing and accelerating electrodes disposed intermediate a light sensing photocathode and a chemical end screen and a pair of deflecting plates located between said focusing and accelerating electrodes and said chemical end screen, a photomultiplier tube coupled with said image amplifier tube at said chemical end screen and selective electric charging means in circuit with said deflecting plates whereby a stream of electrons flowing out of said accelerating electrodes is monitored by said photomultiplier tube which submits an electric impulse to the selective electric charging means, which may place a charge of sufficient intensity on one member of said pair of deflecting plates to deflect said stream of electrons.

3. An image amplifier system comprising an image amplifier tube of the type having accelerating electrodes disposed in advance of a chemical end screen and a pair of deflecting plates located between said accelerating electrodes and said chemical end screen, a photomultiplier tube coupled with said image amplifier tube at said chemical end screen, a preamplifier in circuit with said photomultiplier tube, a linear amplifier in circuit with said preamplifier a pulse height analyzer in circuit with said linear amplifier a pulse stretcher in circuit with said pulse height analyzer, a deflecting amplifier in circuit with said pulse stretcher, said deflecting amplifier being connected with one member of said pair of deflecting plates, and a suitable electric power supply for all image amplifier components.

4. A scintillation camera comprising a nuclear radiation image forming device mounted on a nuclear radiation sensitive screen, an image amplifier system in optical contact with said nuclear radiation sensitive screen, and a recording device positioned so as to receive the output image of said image amplifier system, said image amplifier system comprising an amplifier tube of the type having accelerating electrodes disposed in advance of a chemical end screen and a pair of deflecting plates located between said accelerating electrodes and said chemical screen, said deflecting plates being in circuit with selective electric charging means whereby a charge of sufficient intensity may be selectively placed on one member of said pair of deflecting plates to deflect a stream of electrons flowing out of said accelerating electrodes toward said recording device.

5. A scintillation camera comprising a nuclear radiation image forming device mounted on a nuclear radiation sensitive screen, an image amplifier system in optical contact with said nuclear radiation sensitive screen, and a recording device positioned so as to receive the output image of said image amplifier system, said image amplifier system comprising an amplifier tube of the type having accelerating electrodes disposed in advance of a chemical end screen and a pair of deflecting plates located between said accelerating electrodes and said chemical end screen, a photomultiplier tube coupled with said image amplifier tube at said chemical end screen and selective electric charging means in circuit with said deflecting plates whereby a stream of electrons flowing out of the accelerating electrodes is monitored by the photomultiplier tube which submits an electric impulse to the selective electric charging means which may place a charge of sufficient intensity on one member of said pair of deflecting plates to deflect said stream of electrons toward said recording device.

6. A scintillation camera comprising a nuclear radiation image forming device mounted on a nuclear radiation sensitive screen, an image amplifier system in optical contact with said nuclear radiation sensitive screen, and a recording device positioned so as to receive the output image of said image amplifier system, said image amplifier system comprising an image amplifier tube of the type having accelerating electrodes disposed in advance of a chemical end screen and a pair of deflecting plates located between said accelerating electrodes and said chemical end screen, a photomultiplier tube coupled with said image amplifier tube at said chemical end screen, a preamplifier in circuit with said photomultiplier tube, a linear amplifier in circuit with said preamplifier, a pulse height analyzer in circuit with said linear amplifier, a pulse stretcher in circuit with said pulse height analyzer, a deflecting amplifier in circuit with said pulse stretcher, said deflecting amplifier being connected with one member of said pair of deflecting plates, and a suitable electric power supply for all image amplifier components.

References Cited in the file of this patent

UNITED STATES PATENTS

| | | |
|---|---|---|
| Re. 20,506 | Soller | Sept. 14, 1937 |
| 2,357,922 | Ziebolz et al. | Sept. 12, 1944 |
| 2,750,533 | Schwartz | June 12, 1956 |
| 2,755,390 | Teichmann | July 17, 1956 |
| 2,768,307 | Tirico | Oct. 23, 1956 |
| 2,888,569 | Jones | May 26, 1959 |
| 2,913,669 | Hebert | Nov. 17, 1959 |